United States Patent Office 3,657,357
Patented Apr. 18, 1972

3,657,357
INSECTICIDAL COMPOUNDS AND METHODS FOR THEIR PREPARATION
George Holan, Brighton, Victoria, Australia, assignor to Commonwealth Scientific and Industrial Research Organization, East Melbourne, Victoria, Australia
No Drawing. Filed July 17, 1969, Ser. No. 842,735
Claims priority, application Australia, July 17, 1969, 40,745
Int. Cl. C07c 43/20
U.S. Cl. 260—613 R    5 Claims

ABSTRACT OF THE DISCLOSURE

New insecticides comprising 1,1-bis (p-ethoxyphenyl)-2-nitropropane; 1,1-bis (p-ethoxyphenyl)-2-nitro-n-butane and 1,1 - bis (p - ethoxyphenyl)-2-methyl-2-nitropropane. These compounds are prepared by condensing p-ethoxybenzaldehyde with a compound having the formula

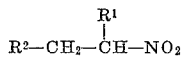

$$R^2-CH_2-\overset{R^1}{\underset{|}{C}H}-NO_2$$

wherein one of the groups $R^1$ and $R^2$ is methyl and the other is hydrogen or methyl, and reacting the carbinol product with phenetole.

---

This invention relates to new insecticidal compounds, methods for preparing these compounds and to new insecticidal compositions containing the compounds.

Throughout this specification, where the context permits, the word "insect" is used in its broad common usage and includes spiders, mites, nematodes and other pests which are not classed as insects in the strict biological sense. Thus the term implies reference not only to those small invertebrate animals belonging mostly to the class Insecta, comprising six-legged, usually winged forms, such as beatles, bugs, flies and the like, but also to other allied classes of arthropods whose members are wingless and usually have more than six legs, such as spiders, centipedes, wood lice and the like, and especially to the order Acaridae which includes the mites and ticks. The words "insecticide" and "insecticidal" are similarly used.

The compounds provided by this invention have the general Formula I

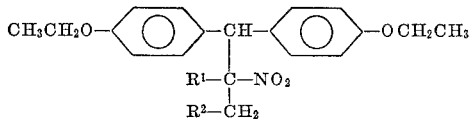

$$CH_3CH_2O-\underset{}{\bigcirc}-\underset{\underset{R^2-CH_3}{\overset{R^1-C-NO_2}{|}}}{CH}-\underset{}{\bigcirc}-OCH_2CH_3 \quad \text{I}$$

wherein one of the group $R^1$ and $R^2$ is hydrogen and the other of said groups is selected from the class consisting of hydrogen and methyl.

Specifically, the compounds provided by the invention are 1,1-bis(p-ethoxyphenyl)-2-nitropropane    (Ia)
1,1-bis(p-ethoxyphenyl)-2-nitro-n-butane    (Ib)
1,1-bis(p-ethoxyphenyl)-2-methyl-2-nitropropane    (Ic)

The compounds I, and particularly compounds Ia and Ib, have substantial insecticidal activity. Against DDT susceptible strains of housefly (*Musca domestica*), their activity is comparable with that of DDT and related insecticides. The compounds Ia and Ib also can be potentiated to high activity levels even against resistant insect strains. It will be noted that the compounds I contain no halogen and thus their insecticidal activity is of particular significance; firstly, because the compounds are unlikely to give rise to any residue problems, and secondly, because the normal detoxification of halogenated insecticides (e.g. DDT) by dehydrochlorination cannot occur, the compounds are active against insects which are highly resistant to DDT. Furthermore, the compounds have been found to have a low mammalian toxicity.

Known compounds related to the compounds I include the p-chloro analogues of Ia and Ib. These compounds are the commercial insecticides "Prolan" and "Bulan" (Hass and Blickenstaff U.S. Pat. No. 2,516,186). The p-methoxy analogue of Ia is also known, as is the unsymmetrical isomer of Ia, i.e. 1-o-ethoxyphenyl-1-p-ethoxyphenyl-2-nitropropane (Jacob, Bachman and Hass, J. Org. Chem., 16, 1572 (1951); Hass, Neher and Blickenstaff, Ind. Eng. Chem., 43, 2875 (1951)). Although insecticidal activity is claimed for the p-methoxy and o,p-ethoxy compounds (Hass et al., op. cit.) we have found that neither compound in fact exhibits significant activity. The activity of these compounds may be contrasted with that of DDT, its p-methoxy analogue ("Methoxychlor") and its p-ethoxy analogue, all of which have comparable activity (see Table I hereinafter).

Because of variations in test procedures and in the test species and strains of insects used to provide the activity data quoted in the prior art, and because there has been a general increase in the resistance of many insect species to DDT and related insecticides since much of the prior art data was reported, it is difficult to make valid comparisons of the activity of any new insecticidal compounds with those of the prior art. Accordingly, except where otherwise noted, the activities quoted herein have been redetermined for a given insect strain by the methods reported in the examples.

Table I compares the thus determined activities of a number of known insecticides with those of the Compounds I, for the housefly (*M. domestica*) and yellow fever mosquito larvae (*Aedes aegypti*).

TABLE I

| Compound | LD₅₀ (*M. domestica*) | LC₁₀₀ (*A. aegypti*) |
|---|---|---|
| 1,1-bis(p-chlorophenyl)-2,2,2-trichloroethane (DDT) | 0.26 | 0.15 |
| 1,1-bis(p-methoxyphenyl)-2,2,2-trichloroethane (Methoxychlor) | 0.33 | 0.25 |
| 1,1-bis(p-ethoxyphenyl)-2,2,2-trichloroethane | 0.31 | 0.08 |
| 1,1-bis(p-chlorophenyl)-2-nitropropane (Prolan) | ¹ 0.87–1.3 | |
| 1,1-bis(p-chlorophenyl)-2-nitro-n-butane (Bulan) | | |
| 1,1-bis(p-methoxyphenyl)-2-nitropropane | (²) | |
| 1-(p-ethoxyphenyl)-1-(o-ethoxy phenyl)-2-nitropropane | (³) | |
| Compound: | | |
| Ia | 0.48 | 0.15 |
| Ib | 0.55 | |
| Ic | 10 | |

¹ Estimated figures. Activities not determined by us but compounds stated to be 0.2 to 0.3 times as active as DDT against *M. domestica*. (See "Organic Insecticides" R. L. Metcalf, Interscience Publishers New York, 1955, at page 139).
² No activity at 12 μg./insect.
³ No activity at 50 μg./insect.

The failure of 1,1-bis(p-methoxyphenyl)-2-nitropropane to possess insecticidal activity comparable with that of "Prolan" would suggest that the p-ethoxy derivative (compound Ia) would be similarly inactive, it being for this reason, no doubt, that it has not been prepared hitherto. The activity of the new compounds, particularly Ia and Ib is thus surprising and furthermore cannot be predicted by currently held theories of insecticidal structure and activity relationships.

Moreover, unlike their analogues having halogen substituents in the aromatic rings, the ethoxy-substituted compounds can be potentiated against insecticide-susceptible and insecticide-resistant species of insects to a degree not observed previously in this general type of insecticide. This potentiation can economically increase the activity of the new compounds against some major resistant species of insects.

The invention also includes methods for the synthesis of the compounds I. Generally the method comprises the base catalysed additions of the appropriate nitro-alkane with p-ethoxybenzaldehyde in a suitable solvent to yield a carbinol which is further reacted with phenetole in the presence of an acid catalyst to give the final product.

More specifically in accordance with the invention there is provided a method for the preparation of compounds of the Formula I, as stated and defined above, which method comprises the steps of:

(a) condensing p-ethoxybenzaldehyde with a compound of the general Formula II

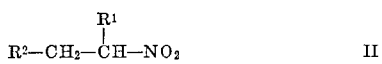

$$R^2-CH_2-\overset{R^1}{\underset{|}{CH}}-NO_2 \qquad II$$

wherein $R^1$ and $R^2$ are as defined above, the condensation being carried out in a suitable solvent and in the presence of a basic catalyst; and (b) reacting the carbinol product resulting from step (a) with phenetole (ethoxybenzene) in the presence of an acid catalyst.

Approximately equimolar quantities of the major reactants are generally used but there may be advantages in employing up to a molar excess of the nitro compound and phenetole.

The solvent/base system for step (a) of the above defined method is selected to satisfy the general criteria for carbanionaldehyde type condensations of nitro aliphatic compounds. For example, such systems include bases in water, such as the alkaline hydroxides; strong organic bases, such as piperidine or other secondary or tertiary cyclic or acyclic amines in protonic or aprotic solvents; and alkali metal alkoxides in alcohols or other aprotic or polar solvents.

We have found that care must be taken in selecting suitable systems as, unless high yields of the carbinol product of step (a) are obtained, the second condensation step (b) may not give the desired product. One especially preferred solvent/base system which we have found to give high product yields is the solvent dimethyl sulfoxide and the very strong organic base 1,5-diazabicyclo [4,3,0] non-5-ene. The preferred reaction temperature for this system is from about 15° to about 25° C.

The compounds I are insecticidally active against houseflies, mosquitoes and other insects including the sheep blowfly and the Queensland cattle tick, both of which are serious pests in Australia. The compounds may be incorporated in a suitable inert solvent, or mixture of solvents, or in a solid mixture with other substances, such as wetting, dispersing and sticking agents. The compounds may be employed in such compositions either as the sole toxic agent or in combination with other insecticides, such as pyrethrum, rotenone, copper salts, etc., or with fungicidal or bactericidal agents, to provide compositions useful for household and agricultural dusts and sprays, textile coating and impregnation and the like. The compounds may be dissolved in suitable organic solvents to provide solutions of enhanced utility. The new compounds may also be placed in aqueous suspension by dispersing organic solvent solutions of the compounds in water. The new compounds may also be mixed with an inert, finely divided, solid diluent or carrier such as bentonite, bole, talc, charcoal, pumice, calcium carbonate and the like. The insecticidal compound may be admixed in its original form or in solution.

In particular, the compounds of the invention may be advantageously combined with other substances which have a synergistic or potentiating action. Generally such substances inhibit the detoxification of insecticides in insects produced by the action of oxidative enzymes. Typical substances of this type are the pyrethrin synergists such as piperonyl butoxide, piperonyl cyclonene, "Sesoxane," "Sesamex," "Sulfoxide," n-propyl-isome and sesamine oil extractives. We have found that the substance "Sesoxane" (made by Chulton Inc., Clifton, N.J., U.S.A.) is particularly useful as potentiator for compounds Ia and Ib ("Sesoxane" is stated to be 2-(3,4-methylene-dioxyphenoxy)-3,6,9-trioxaundecane). The amount of "Sesoxane" used may vary from $\frac{1}{1000}$ to twice the weight of the compound Ia or Ib, the preferred range being from about $\frac{1}{100}$ to an equal part by weight. "Sesoxane" does not significantly increase the activity of DDT and other halogenated insecticides.

It is to be understood that the invention includes all of the above mentioned compositions and other variations thereof as would be evident to persons skilled in the art.

The methods of preparation and the properties of the compounds I are illustrated by the following non-limiting examples.

EXAMPLE 1

Preparation of 1,1-bis(p-ethoxyphenyl)-2-nitropropane (Compound Ia)

(a) p-ethoxybenzaldehyde (15.0 gm.) and nitroethane (15.0 gm.) were dissolved in 350 ml. of dimethyl sulphoxide containing 5 drops of base (1,5-diazabicyclo 4,3,0 non-5-ene) and the mixture stirred at room temperature for 15 hours. The mixture was then poured into ice and after ether extraction yielded 19.3 gm. of an oil containing 1 - p - ethoxyphenyl - 2 - nitro - 1 - propanol together with small amounts of the aldehyde starting material. This product was used for the next stage without further purification.

(b) 6.75 gm. of the impure product obtained as above was added over 1½ hours to a reaction mixture consisting 7.32 gm. of phenetole in 24 ml. of 85% sulphuric acid at −10° C. After a further two hours the mixture was quenched in ice and extracted with ether. The ether extract on evaporation gave a residue which was distilled under reduced pressure to give 1,1-bis(p-ethoxyphenyl)-2-nitropropane (compound Ia) as a brown viscous oil, B.P. 150° C. at $10^{-4}$ torr.; yield 6.2 gm. The product is characterised as follows:

Molecular weight.—Calculated for $C_{19}H_{23}NO_4$ 329; Found 346 (determined using a "Mechrolab" osmometer and methyl ethyl ketone as solvent).

Analysis.—Calculated for $C_{19}H_{23}NO_4$ (percent): C, 69.3; H, 7.0; N, 4.3. Found (percent): C, 71.2; H, 7.2; N, 4.3.

NMR spectrum: δ (p.p.m.)=1.32 (9H, multiplet); 3.92 (4H, quartet); 4.2 (1H, doublet); 5.13 (1H, multiplet); 6.98 (8H, multiplet).

I.R. spectrum: Strong absorption band at 1525 cm.$^{-1}$; assigned to $NO_2$ group. No aldehyde absorption at 1690 cm.$^{-1}$ or OH absorption at 3350 cm.$^{-1}$.

EXAMPLE 2

Preparation of 1,1-bis(p-ethoxyphenyl)-2-nitro-n-butane (Compound Ib)

Using the method of Example 1, 1-p-ethoxyphenyl-2-nitro-1-butanol was prepared from p-ethoxybenzaldehyde (15 gm.) and 1-nitro-propane (15 gm.). The oil obtained was reacted without further purification with phenetole (15 gm.) as before. The product (compound Ib) boiled at 96° C. at 4× $10^{-6}$ torr. The yield was 80% of theory overall and the product was characterised as follows:

Molecular weight.—Calculated for $C_{20}H_{25}NO_4$ 343: Found 343.

NMR spectrum.—δ (p.p.m.)=0.87 (3H, triplet); 1.32 (6H, triplet); 1.70 (2H, multiplet); 3.92 (4H, quartet); 4.20 (1H, doublet); 4.91 (1H, multiplet); 6.5–7.25 (8H, multiplet).

IR spectrum.—Strong absorption at 1525 cm.$^{-1}$. ($NO_2$). No aldehyde or hydroxyl absorption.

EXAMPLE 3

Preparation of 1,1-bis(p-ethoxyphenyl)-2-methyl-2-nitropropane (Compound Ic)

Using the method of Example 1, 1-p-ethoxyphenyl-2-methyl-2-nitro-1-propanol was prepared from p-ethoxybenzaldehyde (15 gm.) and 2-nitropropane (15 gm.). The carbinol was reacted without further purification with phenetole as before to give compound Ic in 20% yield overall. The product was purified by column chromatography and molecular distillation and was characterised as follows:

Molecular weight.—Calculated for $C_{20}H_{25}NO_4$ 343. Found 343 ("Mechrolab" osmometer).

NMR.—$\delta$ (p.p.m.)=1.37 (6H, triplet); 1.53 (6H, singlet); 3.91 (4H, quartet); 4.61 (1H, singlet); 6.9 (8H, multiplet).

Analysis.—Calculated for $C_{20}H_{25}NO_4$ (percent): C, 69.9; H, 7.28; N, 4.1. Found (percent): C, 71.1; H, 7.45; N, 4.6.

EXAMPLE 4

Testing of compounds for insecticidal activity (a) Housefly.—The following test method was used to determine the activities of the compounds I and also the activities of the other insecticides listed in Table 1 above. The tests were carried out by Dr. E. Shipp of the University of New South Wales, N.S.W., Australia.

Housefly tests were carried out on a standard (DDT) susceptible strain (WHO/IN/*Musca domestica*/1), or where indicated, on a DDT resistant strain (Turramurra). Compounds were applied in an acetone solution, by microsyringe, to the dorsum of the thorax of two-day-old female flies reared from pupae of average weight 2.2–2.5 gm./100 pupae. The adult flies were fed on water and sugar-only diet and maintained at 26° C. and 70% RH. The mortalities were counted at 48 hours after treatment and compared with acetone-treated controls. Flies unable to move or stand normally were considered dead. The $LD_{50}$ values were obtained from a logit computer programme based on three replicates of 100 flies at each dose level.

(b) Potentiation.—Compounds Ia and Ib were also tested on the insects described above in conjunction with the potentiator "Sesoxane" by applying 5 microliters of a 2% v./v. acetone solution of ("Sesoxane") with the compound under test.

(c) Yellow fever mosquito larvae.—These tests were also carried out by Dr. E. Shipp. A DDT susceptible strain of *Aedes aegypti* was used. This strain had been maintained in the laboratory for a number of years out of contact with insecticides. Approximately 10–25 first-instar larvae were placed in 10 ml. distilled water with 100 $\mu$l. of solution of the appropriate concentration of the compound in acetone. The lowest concentration, as p.p.m. in the water to produce complete mortality by 48 hours was taken as the $LC_{100}$. No mortality was observed in acetone-only controls.

The results for tests (a), (b) and (c) are given in Table II, for compounds Ia, Ib and Ic together with comparative figures for DDT.

TABLE II

| Insect/strain | Units | Ia | Ib | Ic | DDT |
|---|---|---|---|---|---|
| *M. domestica* (DDT susceptible). | $LD_{50}$ ($\mu$g./Insect). | 0.48 | 0.55 | 10 | 0.26 |
| *M. domestica* (DDT susceptible). (with Sesoxane). | do | 0.065 | 0.12 | | 0.24 |
| *M. domestica* (Turramurra). | do | 0.80 | | | 400 |
| *M. domestica* (Turramurra). (with Sesoxane). | do | 0.062 | | | |
| *A. aegypti* | $LC_{100}$ (p.p.m) | 0.15 | | | 0.15 |

(c) Buffalo fly.—Compound Ia was tested for activity against Buffalo fly (*Lyperosia exigua*).

Tests were carried out by the CSIRO Division of Entomology. The test animals were an isolated herd of 45 mixed cattle heavily infested with buffalo fly (estimated 2000–3000 flies per animal). Each animal was sprayed along the back with ¼ pint (approx. 140 ml.) of a 1% solution of compound Ia as a xylene-"Lissapol" emulsion. When released 1½ hours after spraying, the cattle carried an average of only 3 flies each with a maximum of 10. The cattle remained substantially free from flies for a week after spraying. Progressive increases in the number of flies were noted on the 7th and 9th days after spraying and the mean number was estimated to be 15 to 20 percent on day 9.

The standard treatment for buffalo fly currently in use is 2 pints of a spray containing 2% methoxychlor per animal. This is said to give protection for 11 to 12 days.

(d) Sheep blowfly.—Compound Ia was tested for activity against sheep blowfly (*Lucilia cuprina*) by Dr. M. Whitten of Division of Entomology, C.S.I.R.O. Canberra, Australia.

The tests were carried out using a dieldrin susceptible strain (LBB) and a dieldrin resistant strain (TDR). LBB was collected before dieldrin usage in the field while TDR was collected in 1966 long after the blowfly population had been exposed to dieldrin. TDR is homozygous for a gene on chromosome 5 conferring very high resistance to dieldrin.

Compound Ia was applied in acetone solution, 0.5 $\mu$l dispersed with a Drummond micropipette to the dorsum of the thorax of 2–3 day old females. Adult flies were fed on water and sugar only and maintained at 25° C. and 60–70% RH. The mortalities were determined after 24 hours. Moribund flies were regarded as dead. The $LD_{50}$ values, in terms of concentration, were interpolated from a probit/log dose graph using a computer program and are converted to $\mu$g. in Table III.

Comparative figures for DDT and dieldrin are also given in Table III.

Potentiation.—Compound Ia was tested in the above described conditions using the synergist "Sesoxane" dissolved in acetone. The synergist was applied in the same 0.5 $\mu$l. titre as Compound Ia. Under the experimental conditions 0.1% Sesoxane potentiated Compound Ia more effectively than 1.0% Sesoxane (Table III). Sesoxane increased activity of Compound Ia x 350 in the dieldrin resistant strain and x49 in the dieldrin susceptible strain.

TABLE III

| | $LD_{50}$, $\mu$g./insect | | |
|---|---|---|---|
| | Ia | DDT | Dieldrin |
| Sheep blowfly dieldrin susceptible | 8.5 | 1.07 | 0.025 |
| Sheep blowfly dieldrin resistant | 35.0 | 0.25 | 10 |
| Sheep blowfly dieldrin susceptible ($\mu$g. Sesoxane). | 0.225 | | |
| Sheep blowfly dieldrin susceptible (.5 $\mu$g. Sesoxane). | 0.175 | | |
| Sheep blowfly dieldrin resistant ($\mu$g. Sesoxane). | 0.175 | | |
| Sheep blowfly dieldrin resistant (.5 $\mu$g. Sesoxane). | 0.10 | | |

EXAMPLE 5

Toxicity testing

Compound Ia was tested for acute mammalian toxicity on female Swiss albino mice. The compound was injected intraperitoneally in olive oil (50% solution). Analysis of mortality data gave $LD_{50}$ as 1150 mg./kg. body weight. Under the same test conditions $LD_{50}$ for Compound Ib was 900 mg./kg. body weight.

EXAMPLE 6

The following are examples of insecticidal compositions in accordance with the invention. All parts are by weight.

(a) Water dispersable powder

The following powdered composition is intended for dispersing in water for application as a spray.

| | |
|---|---|
| Compound of Formula I | 50.0 |
| Synthetic fine silica | 30.0 |
| Alkyl aryl sodium sulphonate | 1.5 |
| Methyl cellulose (15 cp.) | .25 |
| Attapulgite | 8.25 |

(b) Spray formulation

The following composition is adapted for spray application.

| | |
|---|---|
| Compound of Formula I | 4.0 |
| "Sesoxane" | 1.0 |
| Pyrethrum | 0.1 |
| Deodorized kerosene | 79.4 |
| Alkylated naphthalene | 16.0 |

(c) Aerosol

The following materials are metered into a suitable "bomb" container sealed and equipped with a valve in the usual way.

| | |
|---|---|
| Compound of Formula I | 3.0 |
| Methylene chloride | 10.0 |
| "Freon 12" | 43.0 |
| "Freon 11" | 43.0 |

I claim:

1. Compounds of the general Formula I,

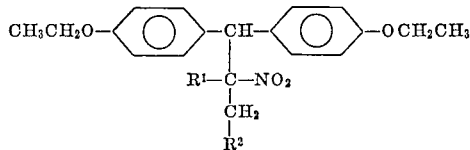

I wherein one of the groups $R^1$ and $R^2$ is hydrogen and the other of said groups is selected from the class consisting of hydrogen and methyl.
2. 1,1-bis(p-ethoxyphenyl)-2-nitropropane.
3. 1,1-bis(p-ethoxyphenyl)-2-nitro-n-butane.
4. 1,1-bis(p-ethoxyphenyl)-2-methyl-2-nitropropane.
5. A method for preparing compounds of the general Formula I,

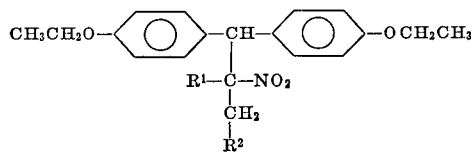

I wherein one of the groups $R^1$ and $R^2$ is hydrogen and the other of said groups is selected from the class consisting of hydrogen and methyl, comprising the steps of:
  (a) condensing p-ethoxybenzaldehyde with a compound of the general Formula II

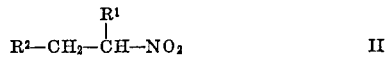

II wherein $R^1$ and $R^2$ are as defined above, in the presence of the basic catalyst 1,5-diazobicyclo[4,3,0]non-5-ene, and the solvent dimethyl sulfoxide; and
  (b) reacting the carbinol product resulting from step (a) with phenetole in the presence of an acidic catalyst.

References Cited

Jacob et al., Jour. Org. Chem., vol. 16 (1951), pp. 1572–1575.

BERNARD HELFIN, Primary Examiner

U.S. Cl. X.R.

424—341